United States Patent
Davey et al.

(10) Patent No.: US 8,238,695 B1
(45) Date of Patent: Aug. 7, 2012

(54) DATA REDUCTION TECHNIQUES FOR PROCESSING WIDE-ANGLE VIDEO

(75) Inventors: Mark Kenneth Davey, Kent (GB); Paul Chernett, Hampshire (GB); Yavuz Ahiska, Esher (GB); Bartu Ahiska, Esher (GB)

(73) Assignee: Grandeye, Ltd., Guildford, Surrey (GB)

( * ) Notice: Subject to any disclaimer, the term of this patent is extended or adjusted under 35 U.S.C. 154(b) by 1601 days.

(21) Appl. No.: 11/611,437

(22) Filed: Dec. 15, 2006

Related U.S. Application Data

(60) Provisional application No. 60/750,735, filed on Dec. 15, 2005.

(51) Int. Cl.
*G06K 9/32* (2006.01)
*G06K 9/54* (2006.01)
*G09G 3/14* (2006.01)

(52) U.S. Cl. ........................ 382/299; 382/303
(58) Field of Classification Search ............ 348/39; 382/298, 299, 302, 303
See application file for complete search history.

(56) References Cited

U.S. PATENT DOCUMENTS

| | | | |
|---|---|---|---|
| 3,971,065 A | 7/1976 | Bayer | |
| 5,402,182 A | 3/1995 | Sugiura | |
| 6,243,099 B1 | 6/2001 | Oxaal | |
| 6,600,517 B1 | 7/2003 | He et al. | |
| 6,665,009 B1 | 12/2003 | Dong | |
| 6,675,386 B1 | 1/2004 | Hendricks | |
| 6,891,533 B1 * | 5/2005 | Alcorn et al. | 345/419 |
| 6,956,967 B2 | 10/2005 | Gindele et al. | |
| 6,958,783 B2 | 10/2005 | Alvarez | |
| 6,965,401 B1 | 11/2005 | Takei | |
| 6,970,194 B1 | 11/2005 | Smith | |
| 7,027,655 B2 * | 4/2006 | Keeney et al. | 382/239 |
| 7,302,103 B2 * | 11/2007 | Keeney et al. | 382/239 |
| 7,307,655 B1 * | 12/2007 | Okamoto et al. | 348/222.1 |
| 7,397,961 B2 * | 7/2008 | Keeney et al. | 382/239 |
| 7,680,192 B2 * | 3/2010 | Kaplinsky | 375/240.2 |
| 7,990,422 B2 * | 8/2011 | Ahiska et al. | 348/218.1 |
| 2003/0043270 A1 * | 3/2003 | Rafey et al. | 348/157 |
| 2004/0001146 A1 | 1/2004 | Liu et al. | |
| 2004/0032968 A1 * | 2/2004 | Andrew et al. | 382/100 |
| 2005/0007453 A1 | 1/2005 | Ahiska | |
| 2005/0007477 A1 | 1/2005 | Ahiska | |
| 2005/0007478 A1 | 1/2005 | Ahiska | |
| 2005/0099500 A1 * | 5/2005 | Fujita | 348/207.99 |
| 2005/0168589 A1 | 8/2005 | Silverstein et al. | |
| 2006/0062478 A1 | 3/2006 | Cetin et al. | |
| 2007/0124783 A1 | 5/2007 | Ahiska et al. | |

\* cited by examiner

*Primary Examiner* — Douglas Blair
(74) *Attorney, Agent, or Firm* — Robert O. Groover, III; Seth A. Horwitz

(57) ABSTRACT

A system and method for reducing the data-rate when processing video, particularly wide-angle video.

9 Claims, 10 Drawing Sheets

```
// XPos       = X Position of point P in the View
// YPos       = Y Position of point P in the View
// xSize      = Horizontal size of View
// ySize      = Vertical size of View
// theta      = Pan angle of Vcam
// phi        = Tilt angle of Vcam
// VFOV       = Vertical field of view of Vcam
//
// qTheta     = Calculated Pan of point with screen coordinates
//              (xPos,yPos)
// qPhi       = Calculated Tilt of point with screen coordinates
//              (xPos,yPos)
//
// trans      = Distance of camera from origin (centre of sphere)
//              0 = at centre of sphere
//              1 = on back face of the sphere
//
void GeomUtils::CalcSpherical(float xPos, float yPos,
                int xSize, int ySize,
                float theta, float phi, float VFOV,
                float& qTheta, float& qPhi, float trans) { float phi_hat[3], theta_hat[3];
float p[3], c[3], camera[3], origin[3];
float inter[6];

// Define origin point
origin[0] = 0.0f;
origin[1] = 0.0f;
origin[2] = 0.0f;

// cos and sin of theta and phi calculated just once
float ct = cosf(theta);
float st = sinf(theta);
float cp = cosf(phi);
float sp = sinf(phi);

// Screen position relative to centre of image
float xs = xSize / 2;
float ys = ySize / 2;
float px = xPos - xs;
float py = yPos - ys;

// Coordinates for screen centre point projected into the sphere.
// Sphere has radius of 1....
c[0] = ct*sp;
c[1] = st*sp;
c[2] = cp;

// Place the camera along the vector passing through c and the origin
camera[0] = c[0] * -trans;
camera[1] = c[1] * -trans;
camera[2] = c[2] * -trans;

// Calculate d, the NUMBER OF PIXELS from c to the camera.
// By dividing the distance from c to the camera in in world units
// (1+trans) by d, we provide a conversion from world units into
// pixels.
//
//          |                     | ys
//          |........             |
//          |        ......       |
//          |             ........| c
// Camera --|----------------------
//          |        VFOV/2.0    d
//
float ay = tanf(VFOV/2.0f);
float ny = ay/ys;
float d = 1.0f / ny;

// Now calculate conversion
pixelInWorldUnits = (1.0f + trans) / d;

// Now work out the unit vectors IN PIXELS
// These are based on theta_hat and phi_hat.
// (See Wolfram website for Spherical Coords)
//
// phi_hat   = [cos(theta)cos(phi), sin(theta)cos(phi),-sin(phi)]
// theta_hat = [-sin(theta), cos(theta), 0]

//The unit vectors naturally have a length of 1 world units. We need
//them to //have a length of 1 pixel in world units.

theta_hat[0] = -st * pixelInWorldUnits;
theta_hat[1] =  ct * pixelInWorldUnits;
theta_hat[2] = 0.0f * pixelInWorldUnits;

phi_hat[0] = ct*cp * pixelInWorldUnits;
phi_hat[1] = st*cp * pixelInWorldUnits;
phi_hat[2] =  -sp  * pixelInWorldUnits;

//Cartesian coordinates for P
p[0] = c[0] + px*theta_hat[0] + py*phi_hat[0];
p[1] = c[1] + px*theta_hat[1] + py*phi_hat[1];
p[2] = c[2] + px*theta_hat[2] + py*phi_hat[2];

// Get Cartesian coordinates for the intersection point on the sphere
// between point P and the camera. Result returned in inter.
int numIntersections =
SphereLineIntersection(camera,p,origin,1.0f,inter);

// Spherical coordinates for the intersection
float r = sqrtf(square(inter[0]) + square(inter[1]) +
square(inter[2]));
qTheta = atan2f(inter[1], inter[0]);
qPhi = acosf(inter[2]/r);
}
```

Figure 6

```
// qTheta,qPhi   = Spherical coordinate of point (radius = 1)
// xCentre       = X Centre of Fisheye circle in pixels
// yCentre       = Y Centre of Fisheye circle in pixels
// x,y           = Returned 2D coordinate on image containing
//                 fisheye circle // The LensTable allows the program to look up radii on the fisheye
// image given a qPhi (polar angle from the z axis) value.

WorldToFisheyeCoords(float qTheta, float qPhi,
            float yCentre, float yCentre,
            float& x, float& y)
{
   // Look up in the Len Table the radius corresponding to qPhi (tilt)
   float rad = LensTable->GetRadius(qPhi);

// Generate 2D Cartesian coordinates from polar coordinates (rad.
qTheta)
   x = rad * cosf(qTheta) + circleXCentre;
   y = rad * sinf(qTheta) + circleYCentre;
}
```

Figure 8

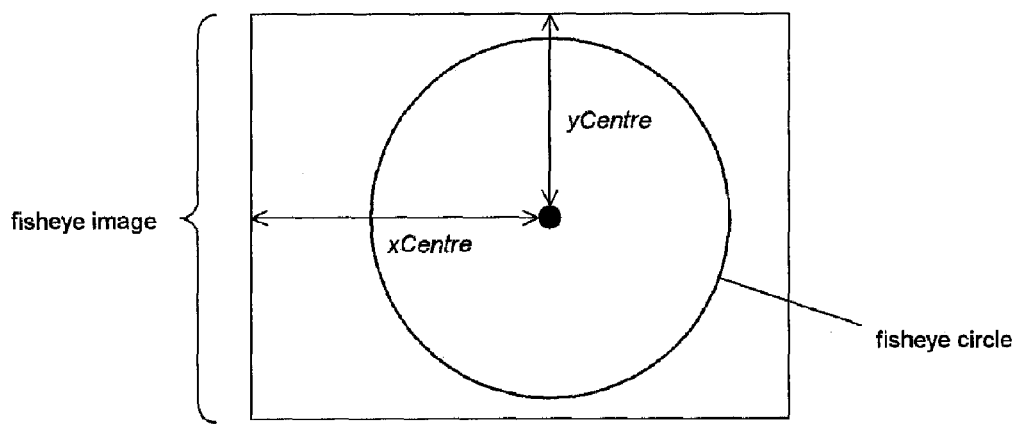

Figure 9

DATA REDUCTION TECHNIQUES FOR PROCESSING WIDE-ANGLE VIDEO

CROSS-REFERENCE TO RELATED APPLICATIONS

This application claims priority from U.S. provisional patent application 60/750,735 filed on Dec. 15, 2005, which is hereby incorporated by reference.

BACKGROUND AND SUMMARY OF THE INVENTION

The present application relates to video processing, and more particularly to efficient processing of video in limited resource environments.

DESCRIPTION OF BACKGROUND ART

Wide-angle video surveillance systems have become increasingly popular in security monitoring applications. Wide-angle monitoring can provide a full-surround situational awareness. In addition, wide-angle cameras can provide virtual camera (VCAM) views to emulate multiple mechanically steerable pan-tilt-zoom (PTZ) cameras. As the reliability is of paramount importance in a security installation, non-mechanical wide-angle cameras are gaining increasing acceptance in the CCTV market. In order to compete with cameras using a mechanical zoom, the wide-angle cameras must have a sufficiently high-resolution image sensor.

A variety of technologies exist for digitally capturing images including charge coupled device (CCD) sensors and the alternative low-cost complementary metal oxide semiconductor (CMOS) sensors. The continuing improvements in the image sensor technology used to capture the video facilitates the increase in output resolution, and consequently contributes to the rising output sensor data-rates. Currently video cameras with sensors at 3 mega-pixel resolutions are commonly used, and up to 7 mega-pixel resolutions are projected.

Raw sensor data requires a number of image-processing steps to produce realistic images. The escalating data-rates are mounting the demand on the hardware used to perform this processing. Limited in part by cost and power budgets, the capability of the hardware in mainstream surveillance cameras is not following the marked rise in sensor data-rates.

Image-Processing Techniques

Examples of pipelines encapsulating required image-processing steps are shown in FIG. 1A (Halocam) and FIG. 1B (Pixelink). In a given camera, the steps included and their relative ordering will typically differ depending on the chosen sensor, the availability, power and architecture of processing hardware, the required image quality and the cost budget. Typical processing steps for a CMOS based camera include:
  a) dead pixel correction
  b) static noise reduction
  c) dynamic noise reduction
  d) demosaicing/de-bayering
  e) white-balance adjustment
  f) colour-correction
  g) image sharpening Dead pixels: Due to manufacturing defects, a sensor may have individual pixel elements that constantly output a fixed value, rather than varying their output in response to the amount of illumination. Other pixel elements may output a value constantly much higher or lower than expected. Such undesirable anomalous pixels are respectively referred to as dead-pixels, bright-pixels, or dark-pixels in accordance with how they appear on the output display. U.S. Pat. No. 6,665,009, entitled "On-Chip Dead Pixel Correction in a CMOS Imaging Sensor," which is hereby incorporated by reference, discloses one method for correcting for dead pixels in a CMOS sensor. The pixel array is examined for dead pixels, the locations of which are digitally stored. As a given frame from the sensor is scanned out, identified dead pixels are compensated for. One disclosed method of compensating for a dead pixel is to replace it with the pixel signal from a previous pixel, or an average of the previous and following pixels. An alternative method of dead pixel correction is disclosed in U.S. Pat. No. 6,970,194, entitled "Defect Correction in Electronic Imaging Systems," which is hereby incorporated by reference.

De-bayering: A common method of recording a colour image is to cover each pixel site with an optical filter that allows only one of three primary colours to fall on that pixel. The most common pattern for this Colour Filter Array (CFA) is the Bayer Filter Pattern, disclosed in U.S. Pat. No. 3,971,065, entitled "Color Imaging Array". This pattern alternates a row of red and green filters with a row of blue and green filters. The raw Bayered output from the sensor has to be processed with a "demosaicing" or 'de-bayering' algorithm in order to reconstruct the colours of the image from the monochrome source. The true colour value of a pixel can be determined by using the values from surrounding pixels as well as its own. Alternative filter patterns and colour-capture methods have been used. U.S. Pat. No. 3,971,065 further discloses an array comprising of one luminance and two chrominance filters. Additional methods include filters that use colours other than red, green and blue. All of the described methods still require at least a form of colour-combination or other colour processing to create a realistic true-colour image. The quality of the de-bayering algorithm is particularly important in creating a realistic image if a portion of the captured image is to be enlarged.

White-balance: The human visual system (HVS) is able to compensate for variations in the colour temperature of the light illuminating a scene. White objects are still seen as white even though the light illuminating them is reddish (incandescent lighting) or bluish (sunlight). However when observing a monitor the HVS is unable to perform this correction as it draws its reference form the environment in which the monitor is placed. This is also a problem when monitors showing different scenes are viewed side by side, for example in a control room. White balancing is thus required in a camera to normalise scenes so that white or neutral grey objects are displayed as neutral white or grey, even though the sensor has detected them as up as reddish or bluish. U.S. Pat. No. 5,402,182, entitled "Automatic White-Balance Controlling Apparatus," and U.S. Pat. No. 6,965,401, entitled "White Balance Correcting Device," which are hereby incorporated by reference, disclose methods of automatically controlling the white-balance of a colour video camera.

Colour-correction: In addition, each sensor type may differ in the degree to which light can bleed from one pixel to its neighbours, often depending on the colour of the filter element. This has the effect of reducing the saturation of the colours in the output image and sometimes causing them to be somewhat untrue. In order to correct for this effect a matrix (the "Colour Correction Matrix" or CCM) needs to be applied to each pixel. U.S. Pat. No. 6,956,967, entitled "Color Transformation for Processing Digital Images," which is hereby incorporated by reference, discloses the calculation and application of a colour correction transform. Input image features such as under-exposure, contrast and colour-balance can also be corrected using this method.

Noise Reduction: Sensor noise, typically defined as variation in pixel values due to the sensor electronics rather than the observed scene, can be time-variant random noise ("dynamic noise"), or a fixed pattern superimposed on the scene ("static noise"). Dynamic noise can be generated by a variety of sources, including electronic interference and thermal noise in components. Since dynamic noise typically affects each pixel differently it can be significantly reduced using a low-pass filter, however desired image detail might be lost. U.S. Pat. No. 6,958,783, entitled "Adaptive Non-Linear Noise Reduction Techniques," which is hereby incorporated by reference, discloses an alternative non-linear method for impulsive noise reduction. Dynamic noise reduction is particularly important for images obtained using high-resolution CMOS sensors as they typically have more noise than low resolution and CCD sensors. Static noise may also result from a variety of sources, including uneven signal boost among different pixel amplifiers. The most common method of reducing this static noise is to read the fixed-pattern into a table from a test image, and remove it from subsequent frames using a subtraction.

Sharpening: De-bayering and de-noising tend to soften the output image, which can be perceived as it being 'out of focus'. This effect can be alleviated by the use of a sharpening filter. U.S. Pat. No. 6,600,517, entitled "System and Method for Improving the Sharpness of a Video Image," which is hereby incorporated by reference, discloses a method of sharpening video.

Handling and processing of high-resolution images with the well known aforementioned techniques are often impractical because of the number of pixels involved and limited resources such as processor capability, power, bandwidth and storage space. For example, a 1 mega-pixel (MP) video at 5 frames-per-second (fps) with 10 bit/pixel has a data-rate of $5 \times 10^7$ bit/sec, while a higher-resolution 3 MP video at 12 fps with 10 bit/pixel has an increased data-rate of $36 \times 10^7$ bit/sec.

VCAM View Generation

A new class of camera replaces the mechanical Pan-Tilt-Zoom (PTZ) functions of a steerable camera with a wide-angle optical system and image processing, as discussed in U.S. patent application Ser. No. 10/837,019 entitled "Method of Simultaneously Displaying Multiple Views for Video Surveillance," which is hereby incorporated by reference. This class of camera is further discussed in U.S. patent application Ser. No. 10/837,325, now U.S. Pat. No. 7,450,165, entitled "Multiple View Processing in Wide-Angle Video Camera," which is hereby incorporated by reference. The behavior of a mechanically steerable PTZ camera is emulated using a "virtual camera" (VCAM) with an associated VCAM view that is controlled through electronic PTZ (ePTZ). The VCAM view is preferably defined by a pan, tilt and horizontal and vertical FOVs. In one mode of operation, an operator issues the ePTZ controls through local device input such as mouse, keyboard or joystick. In another mode, ePTZ controls are issued from software performing motion analysis such as motion detection, moving region tracking or object tracking on a decimated version of the wide-angle image. An embodiment of the current invention which enables the processing of portions of the wide-angle image corresponding to VCAMs will become particularly important for the future of such cameras.

The wide-angle optics of the aforementioned ePTZ camera introduces distortion into the captured image, and processing algorithms using 3D computer graphics techniques are used to alleviate the distortion and convert a portion of the wide-angle image into a view that has a stereographic projection. U.S. Pat. No. 6,243,099, entitled "Method for Interactive Viewing Full-Surround Image Data and Apparatus Therefore," which is hereby incorporated by reference, discloses a method of projecting a full-surround image onto a surface. The full-surround image data is texture-mapped onto a computer graphics representation of a surface to model the visible world. A portion of this visible world is projected onto a plane to achieve one of a variety of perspectives. Stereographic projection is implemented by using a spherical surface and one-to-one projecting each point on the sphere to points on an infinite plane by rays from a point antipodal to the sphere and the plane's intersection. Other methods of image transformation are discussed in the embodiment.

Intelligence within the Camera

There is a continuing trend for increased intelligence in wide-angle cameras, including features such as motion analysis. A typical video surveillance scene will consist of both foreground objects containing important information and the background, which may contain relatively less useful information. In a typical camera, regions of interest (RoI) are defined for areas containing expected interesting motion which need to be captured, as described in U.S. patent application Ser. No. 11/203,807, entitled "Region-Sensitive Compression of Digital Video," which is hereby incorporated by reference. Motion analysis, such as motion detection and object tracking, facilitates the capture of such RoI activity.

A method of motion analysis can be used as disclosed in U.S. Pat. App. No. 60/665,767, entitled "Tracking Moving Objects Accurately on a Panoramic Video," and from the teachings of U.S. patent application Ser. No. 11/184,720, now U.S. Pat. No. 7,990,422, entitled "Automatically Expanding the Zoom Capability of a Wide-Angle Video Camera," and U.S. patent application Ser. No. 10/924,279, entitled "Tracking Moving Objects in Video Using Wavelet Domain Information," which are hereby incorporated by reference.

Data Reduction Technique for Processing Wide-Angle Video The present innovations relate to methods of reducing the data-rate when processing wide-angle video to provide a cost effective solution. In some exemplary embodiments, the present innovations include:

(a) methods for intelligently extracting a portion of wide-angle raw sensor data corresponding to a VCAM view before processing;
(b) methods for intelligently manipulating raw sensor data before processing to generate multiple views; and
(c) methods for periphery enhancing scaling of wide-angle raw sensor data for motion analysis.

Preferred embodiments of the present innovations include techniques for reducing the data-rate of high-resolution wide-angle video, hence providing a cost effective solution for the image processing. For example, in one exemplary embodiment, the system processes only a portion of a wide-angle image corresponding, for example, to a VCAM view. This VCAM view may be steered by an operator or by intelligence within the camera, such motion analysis functionality. Other examples are described more fully below.

The present innovations provide methods and systems for making efficient use of the limited resource environment in many camera systems. Preferred embodiments using a VCAM can be automatically and intelligently steered using computation on the image involving motion analysis, examples of which may include motion detection, moving region tracking or object tracking.

Other examples and advantages are described below.

BRIEF DESCRIPTION OF THE DRAWINGS

The disclosed inventions will be described with reference to the accompanying drawings, which show important sample embodiments of the invention and which are incorporated in the specification hereof by reference, wherein:

FIG. 6 shows example code consistent with an example embodiment of the present innovations.

FIG. 8 shows example code for characterization of a lens.

FIG. 9 shows how image processing can displace a fisheye circle.

DETAILED DESCRIPTION OF THE PREFERRED EMBODIMENTS

The numerous innovative teachings of the present application will be described with particular reference to the presently preferred embodiment (by way of example, and not of limitation).

Intelligently Extracting a Portion Raw Sensor Data Corresponding to a VCAM View In a preferred embodiment, a portion of the wide-angle raw sensor data corresponding to a VCAM view is extracted for processing ("Extracted Portion for VCAM View", or "EPVV"). As a ePTZ-controlled VCAM only views a limited FOV of the wide-angle fisheye scene, processing of the whole raw sensor data is unnecessary. Raw wide-angle data is retrieved from the sensor, and the EPVV is preferably selected using a binary mask that represents the transformed VCAM view coordinates.

To generate a mask of the EPVV, the VCAM view definition needs to be converted into the planar wide-angle image coordinate system. As described in U.S. patent application Ser. No. 11/287,465, entitled "Interactive Wide-Angle Video Server," which is hereby incorporated by reference, a function can be derived for mapping between every pixel (p) in the VCAM view and an associated coordinate in the planar wide-angle image coordinate system.

Figure 7:
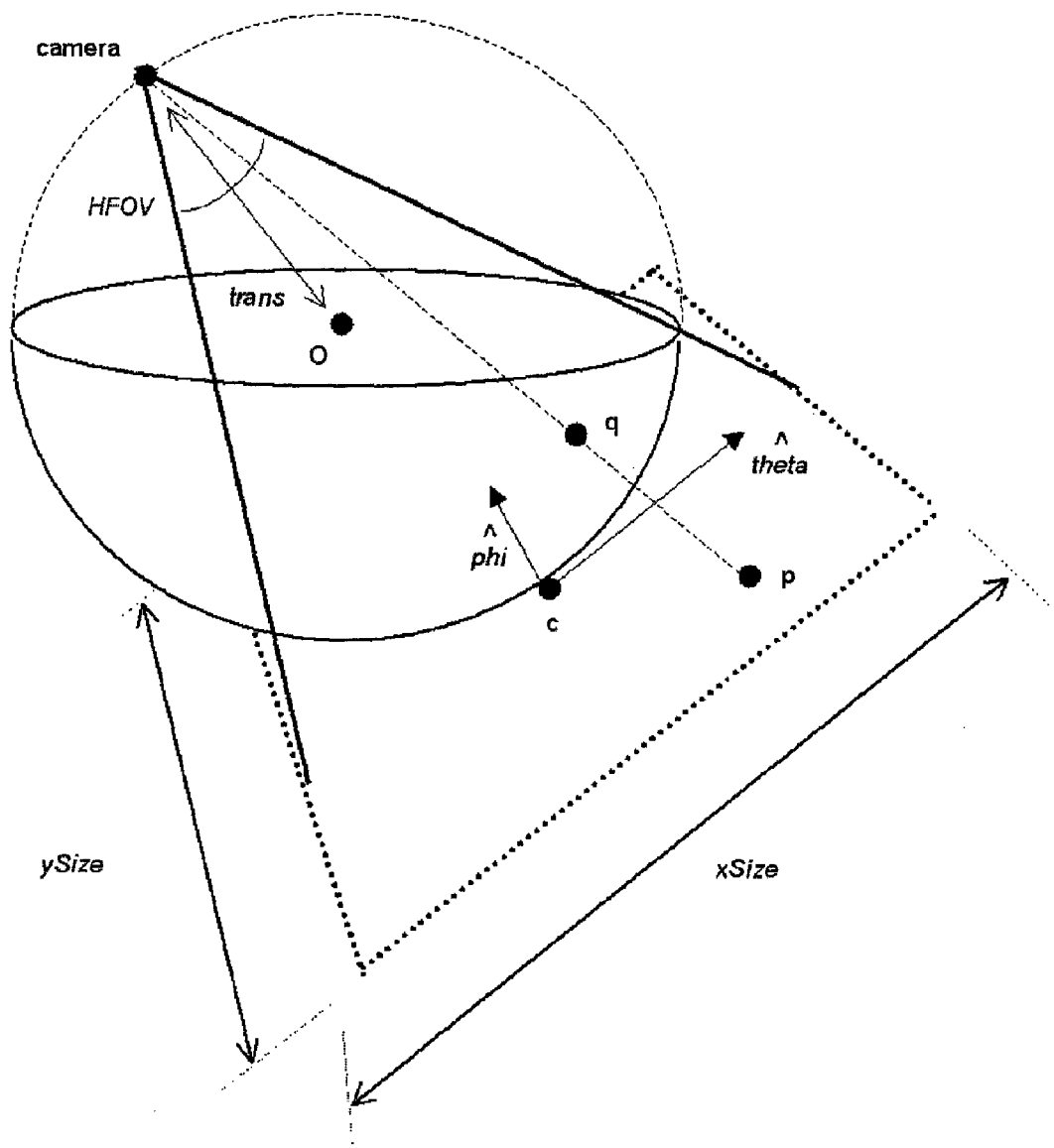
FIG. 7 shows an example of a pixel plane in a particular view.

In the preferred embodiment, this coordinate mapping is performed by introducing intermediate spherical-polar "world-coordinates" (see, for example, Mathworld: Coordinate Geotmetry, "Spherical Coordinates," Wolfram Research at http://mathworld.wolfram.com/SphericalCoordinates.html). 3D computer graphics techniques are used to project any pixel p onto a triangulated partial sphere surface with unity radius (FIG. 6). Pixel p lies on a plane (representing the VCAM view) with size xSize, ySize (FIG. 7). The plane is tangential to the partial sphere, with point of intersection c at the centre of the plane (determined by theta and phi: the pan and tilt angle of the virtual camera). The origin of the world coordinate system (O) is located in the centre of the sphere. A camera is placed along a line connecting point c with O, at a distance trans on the opposite side of O as c. If this distance trans is unity (same as the radius of the sphere), one is performing stereographic projection; whereas trans set to zero results in performing linear perspective projection. A ray generated by connecting the camera to the point p will intersect the partial sphere at a point q, with coordinates (qTheta, qPhi, 1). In this way, the qTheta and qPhi of every associated point p may be calculated.

When using a wide-angle lens, it is preferable to accommodate the lens characteristics. A function is used to obtain the 2D coordinates on the wide-angle fisheye image corresponding to q (and therefore corresponding to p). This function depends on the characteristics of the lens used to capture the wide-angle image (FIG. 8). In the preferred embodiment, a fisheye lens is used with a linear relationship between the captured FOV and the radial distance from the centre of the corresponding fisheye circle. The characteristics of imaging through the lens are stored in table (LensTable). LensTable returns a radius (rad in pixels) when given qPhi as input. The imaging process may result in a fisheye circle that is not in the centre of the fisheye image (FIG. 9), characterised by circleXCentre and circleYCentre. Using this information, together with rad and qTheta, the 2D Cartesian coordinates (x,y) of the point on the fisheye image corresponding to point p are calculated. This operation is applied to every point in the VCAM view to define an associated EPVV in the fisheye image.

Figure 10A:
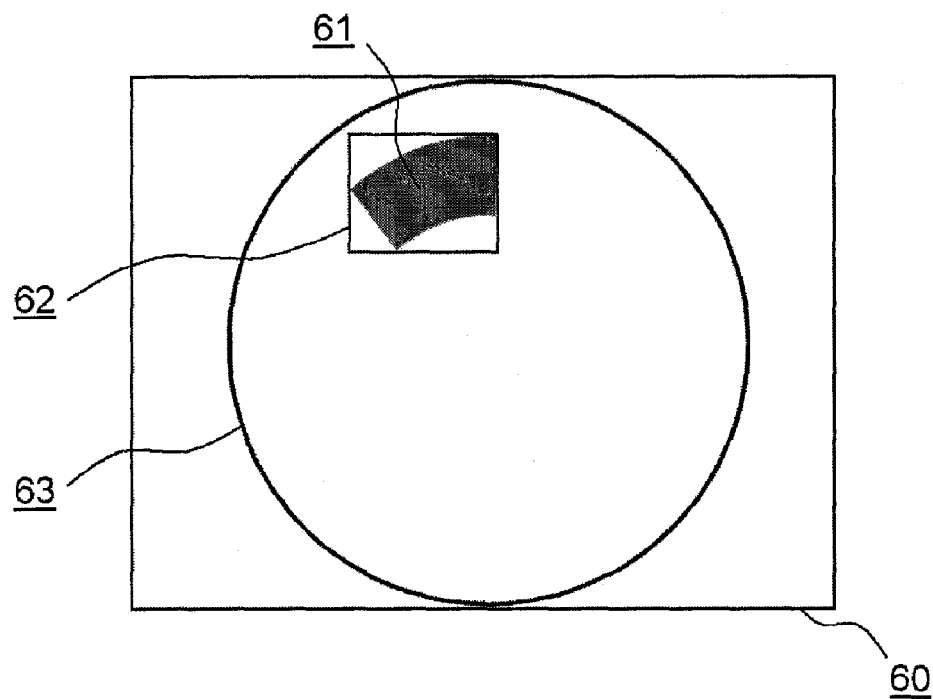
FIG. 10A shows an example system at a particular time.

FIG. 10A shows an example of a fisheye image [60] and an EPVV [61] in an instance of time. An EPVV mask is generated and used to extract the required raw fisheye image data. In one embodiment a binary mask of the image is generated, with the pixels representing the EPVV set to HIGH (1), and the other pixels set to LOW (0). This mask can be applied to the raw sensor data to leave the EPVV. The mask shape is simplified in another embodiment, by using the bounding-box of the EPVV [62].

Figure 10B:
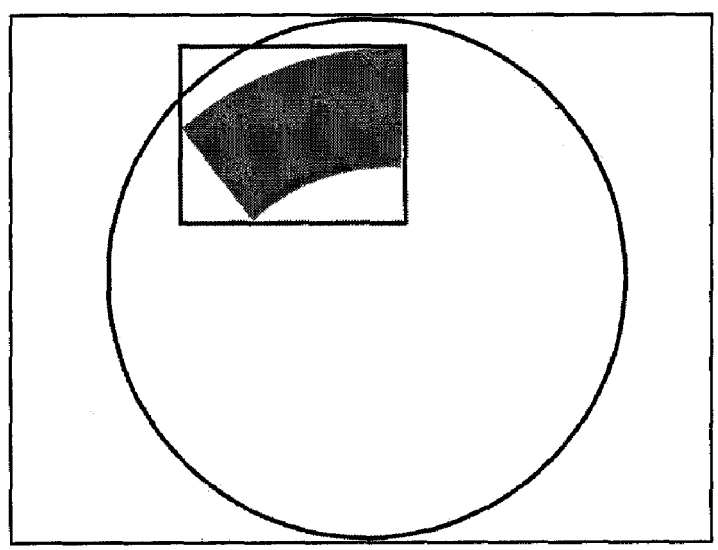
FIG. 10B shows a similar system at different zoom.

FIG. 10B shows a similar example of an EPVV at a lower zoom level (more "zoomed out"). As the VCAM is zoomed out, the proportion of the sensor data occupied by the EPVV increases. In this example embodiment, in order to limit the EPVV data size, the EPVV data is decimated (reduced in resolution) in accordance with the zoom level in the preferred embodiment. The decimation is increased for an EPVV that occupies a larger portion of the sensor data. The decimation can be achieved by sub-sampling the data at a lower spatial frequency. More advanced methods of this scaling will be known to those of ordinary skill in the art.

The extracted EPVV data is preferably processed in a pipeline (as described in the disclosed prior-art) to give a realistic image. The pipeline will typically include steps such as dead-pixel correction, demosaicing, colour correction, white balance adjustment, etc. In the preferred embodiment, the processing is performed in conjunction with feedback signals to the sensor, allowing sensor characteristics such as exposure and gain control to be modified.

The processed EPVV image is transformed to generate a VCAM view. The transformation is based on any of a number of techniques, possibly one of:
tabular distortion-correction methods;
3D projection methods; and
2D transform mapping methods.

Figure 11:
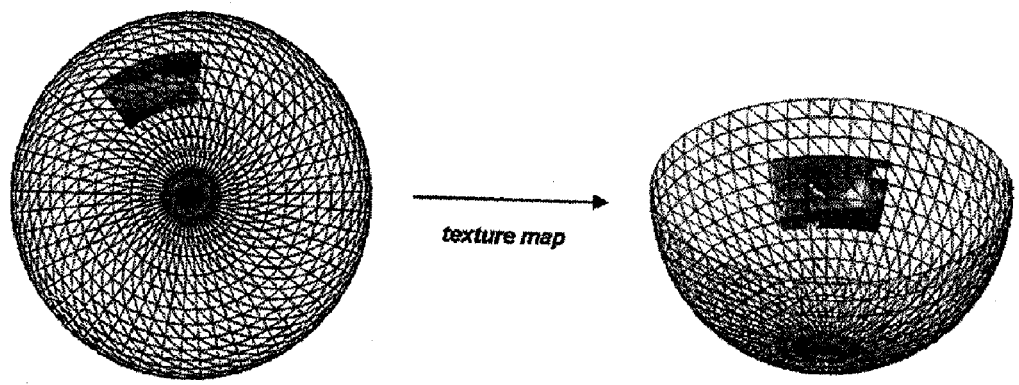
FIG. 11 shows an example texture mapped image.
Figure 12A:
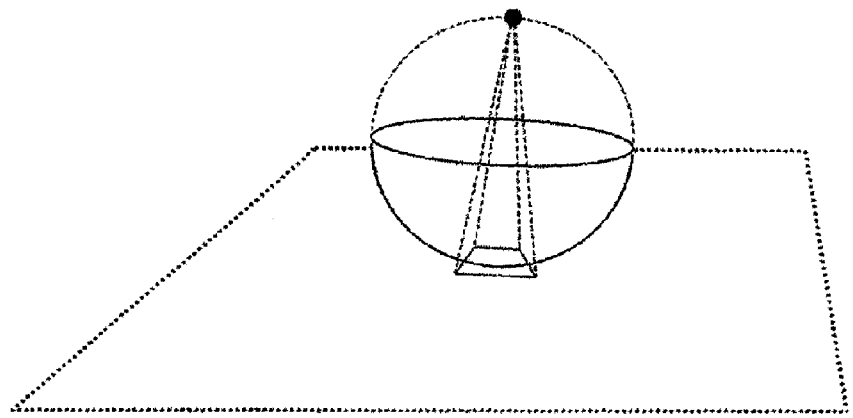
FIGS. 12A and 12B show an image plane intersecting a partial sphere at different tilts.
Figure 12B:
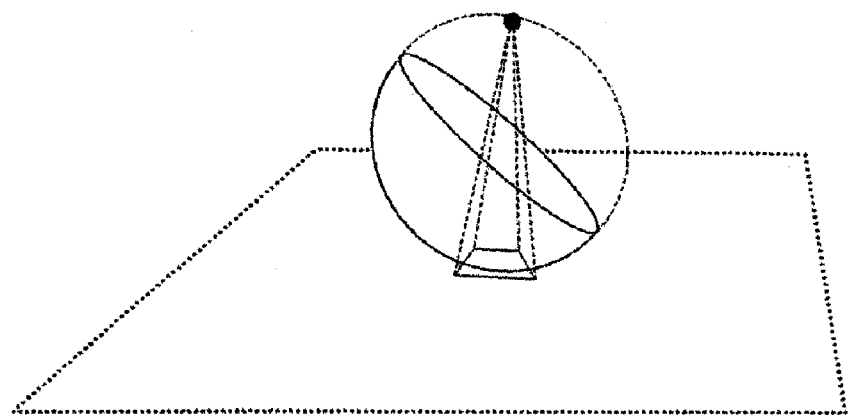

The preferred embodiment uses 3D graphics hardware in the camera to implement the second category of transformation. The processed EPVV image is texture mapped onto a triangulated surface representing a partial sphere with unity radius (FIG. 11). The undefined areas of the texture, for which no data were received due to windowing, are inconsequential and may be filled with an arbitrary pixel colour. The mapping is a well-known 3D computer graphics technique and can be implemented by storing information representing an approximately circular grid of triangles to assign the texture. In the preferred embodiment the mapped texture is stereographically projected onto a plane (image plane) representing the VCAM view, a method disclosed in U.S. Pat. No. 6,243,099, entitled "Method for Interactive Viewing Full-Surround Image Data and Apparatus Therefor," which is hereby incorporated by reference. The model is described by a spherical polar coordinate system with an origin in the centre of the partial sphere. The VCAM view is defined by the known pan, tilt and horizontal and vertical fields-of-view (FOV). The image plane is tangential to the partial sphere and intersects at a point defined by the pan and tilt (e.g. FIGS. 12A and 12B). The intersection point and the FOVs define the points that need to be projected to create the VCAM view. Projecting rays from the antipodal point of the plane/sphere intersection results in a stereographic projection; rays projected from the centre of the partial-sphere results in a linear perspective projection. In a further embodiment, the projection point can be moved between these two positions in response to zoom PTZ commands. This represents a hybrid use of stereographic and linear perspective projection (and states between), a method as suggested in U.S. Prov. Pat. App. No. 60/681,109, entitled "Stereographic Correction in a Camera," which is hereby incorporated by reference.

Alternative transformation techniques can be used to alleviate the disctortion. A preferred embodiment may use a transformation belonging to one of the other categories if a camera does not have 3D graphics hardware. The first category includes U.S. patent application Ser. No. 10/837,012, now U.S. Pat. No. 7,529,424, entitled "Correction of Optical Distortion by Image Processing," which is hereby incorporated by reference. The distortion is corrected by reference to a stored table that indicates the mapping between pixels in the distorted wide-angle image and pixels in the corrected image. On the other hand, U.S. patent application Ser. No. 10/186,915, now U.S. Pat. No. 7,058,237 entitled "Real-Time Wide-Angle Image Correction System and Method for Computer Image Viewing," which is hereby incorporated by reference, generates warp tables from pixel coordinates of a wide-angle image and applies the warp tables to create a corrected image. The third category includes U.S. Pat. No. Re 36,207, entitled "Omniview Motionless Camera Orientation System," which is hereby incorporated by reference, which discloses a system and method of perspective correcting views from a hemispherical image using 2D transform mapping. The correction is achieved by an image-processor implementing an orthogonal set of transform algorithms. The transformation is predictable and based on lens characteristics.

The VCAM video will typically need to be transformed to analogue video or compressed before transmission over a medium (such as TCP/IP or USB) to a storage device or remote client. Common compression methods include MPEG or Wavelet compression. The compression and/or decompression a high-resolution video is computationally expensive due to the large number of pixels. The preferred embodiment alleviates these problems by extracting and compressing a limited EPVV of the full wide-angle data.

If the camera has an image pipeline with sufficient throughput, the problems can still be alleviated in an alternative embodiment by performing EPVV extraction after the image processing stage, but before compression. In another embodiment, the camera does not have the functionality required to transform the distorted EPVV. The compressed EPVV is fed to a remote client, which performs the required image transformation.

A typical sensor can be configured to window its data to specified dimensions and resolution. In one embodiment, the data-rate from the sensor is reduced by windowing to the dimensions and position of the EPVV bounding-box. This windowing may be achieved in the "Micron 3 MP CMOS MT9T001" sensor by entering values into sensor registers corresponding to the (i) first row to be read out, (ii) first column to be read out, (iii) window height, and (iv) window width.

Typical digital image sensors have the capability of providing sub-sampled data. For example, the "Micron 3 megapixel CMOS sensor MT9T001" can be controlled to output a defined segment or slice of its available output, commonly referred to as "windowing". The Micron sensor has registers that control the size and resolution of this window, allowed sub-sampled data to be obtained. Implementing a smaller and/or lower resolution window has the affect of decreasing the data corresponding to each frame. As a result the possible sensor frame rate increases. The "Kodak KAI-4021" image sensor range has similar functionality for obtaining sparser data, referred to as "binning". Typical image sensors can provide lower-resolution images using algorithms that have a form of averaging signals from multiple photosites. U.S. patent application Ser. No. 10/769,652, entitled "Method and System for Processing an Image with an Image-Capturing Device," which is hereby incorporated by reference, describes a method of allowing a user to simultaneously retrieve a high-resolution still image and a lower-resolution video image. This method of processing image data, as enabled with the mentioned sensors, has been available preceding the publication of '652 and represents a prior-art.

Intelligently Manipulating Raw Sensor Data to Generate Multiple Views

In a preferred embodiment, the raw sensor data is intelligently manipulated to enable the generation of a wide-angle panoramic video image in conjunction with a typically narrower-FOV VCAM view.

In this preferred embodiment, a composite video is generated by compositing the VCAM view image and the panoramic image, wherein each image occupies a portion of said composite ("Multiview").

In a preferred embodiment, the full extent of the raw fisheye image data is retrieved from the sensor (full image width and height). Preferably view data are extracted from the raw data using two independent methods, which preferably (but need not necessarily) include:
decimating (or otherwise reducing) the raw sensor data to generate an effectively lower-resolution version of the raw wide-angle image for panoramic image generation ("Decimated Data for Panoramic View", or "DDPV"); and extracting by means of cropping and typically decimating the raw sensor data to corresponding to a VCAM view ("Extracted Portion for VCAM View", or "EPVV").

A method for obtaining EPVV is described in the previous section: by transforming the ePTZ-controlled VCAM view coordinates to specify a portion on the wide-angle image.

In order to obtain a multiview, both the DDPV and EPVV are processed by passing through separate image pipelines. In one embodiment DDPV and EPVV may be generated in a time multiplexed fashion using the same processing elements. In a preferred embodiment, sensor characteristics (such as exposure control) are modified by feedback signals from the DDPV processing pipeline since DDPV represents the whole FOV. Adjusting the characteristics of the sensor using the DDPV allows the sensor to provide a maximum amount of global information with a good dynamic range. However, this sensor setting may not be the ideal for the generation of a realistic VCAM image. For example, the portion displayed by the VCAM view may become unrealistically dark which may be further processed to adjust its brightness and contrast. Otherwise EPVV pipeline is similar to the pipeline described in the section above and includes noise reduction, de-bayering and 3D transformation and edge enhancement steps.

In an embodiment, dead-pixel correction is performed separately in each of the pipelines. In another preferred embodiment, the dead-pixel correction is performed on the raw data before the images are sub-sampled.

Periphery Enhancing Scaling of Raw Sensor Data for Motion Analysis

It is common practice to decimate the captured date to perform motion analysis (such as motion detection or object tracking), as it is computationally very expensive. Motion analysis is often conducted on the full-FOV of the wide-angle image. The resources in a camera may not be able to handle such analysis of images with a large number of pixels. However, simple decimation by sub-sampling results in a uniform loss of information, whereas it is often required to keep the image periphery at a higher quality. In a preferred embodiment, the raw sensor data may be scaled while maintaining the quality in the image periphery.

The preferred embodiment uses a conventional fisheye lens, e.g., one with a field of view of approximately 180 degrees. The RoI in wide-angle scene may coincide with the periphery of the sensor image, which is captured at a lower resolution due to the fisheye properties. Because of the circular distortion introduced by the wide-angle lens, the periphery often warped. This typically results in this highly distorted area being imaged by a relatively small area of the available image sensor, leading to lower resolution in the areas of interest and higher resolution in areas that are of lower interest.

Conventionally the conversion from high resolution to lower resolution is done using a spatially or radially linear scaling function that preserves the aspect ratio of the original. This scaling of the image means that the resulting loss of resolution is equal in all parts of the image. The periphery may thus contain insufficient data for accurate motion analysis, whereas there was sufficient data in the original image.

Figure 1A:
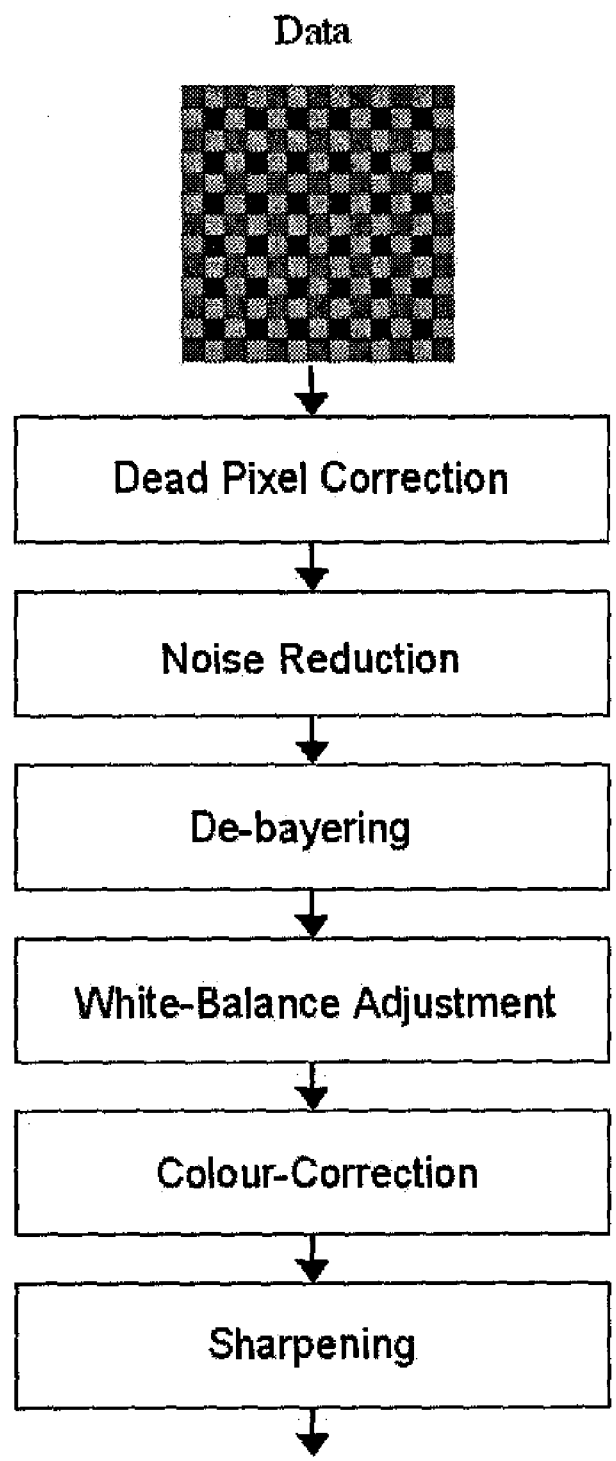
FIG. 1A shows a flowchart of various processes invoked during image processing.
Figure 1B:
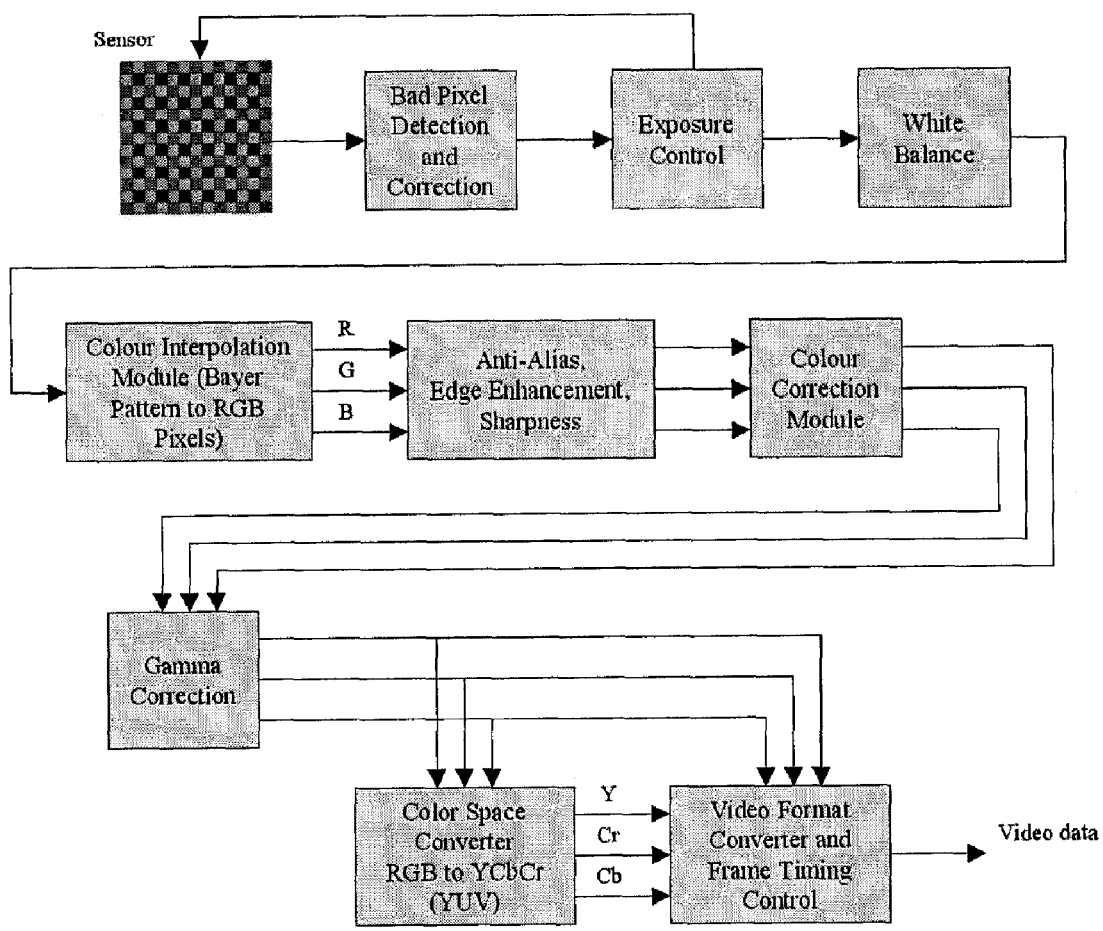
FIG. 1B shows a more detailed set of image pipeline steps.
Figure 2:
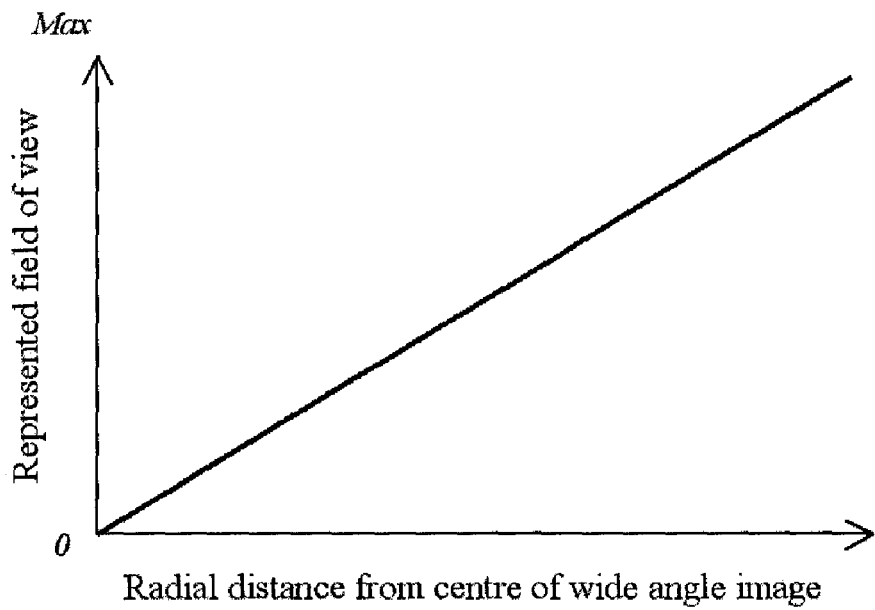
FIG. 2 shows a relationship between radius and field of view.
Figure 3:
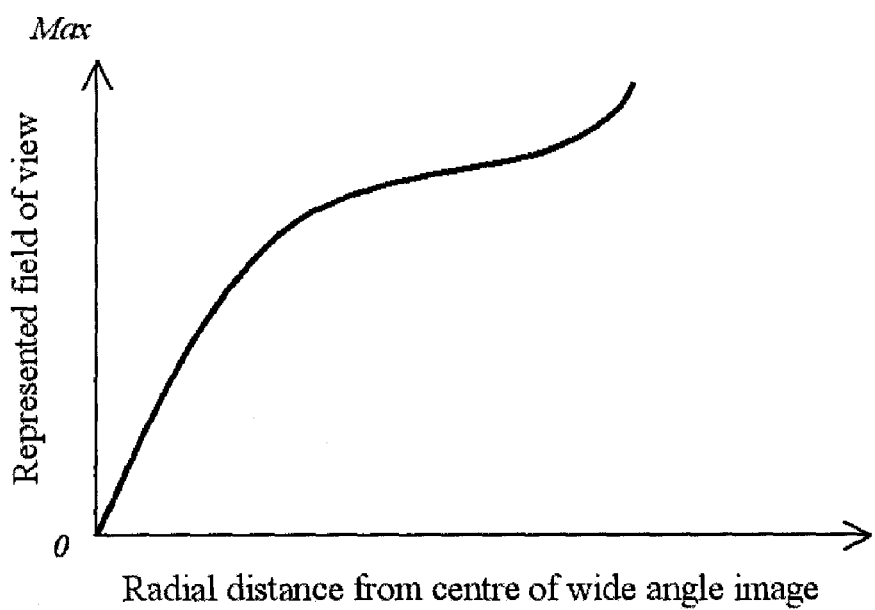
FIG. 3 shows another possible relationship between radius and field of view.
Figure 4:
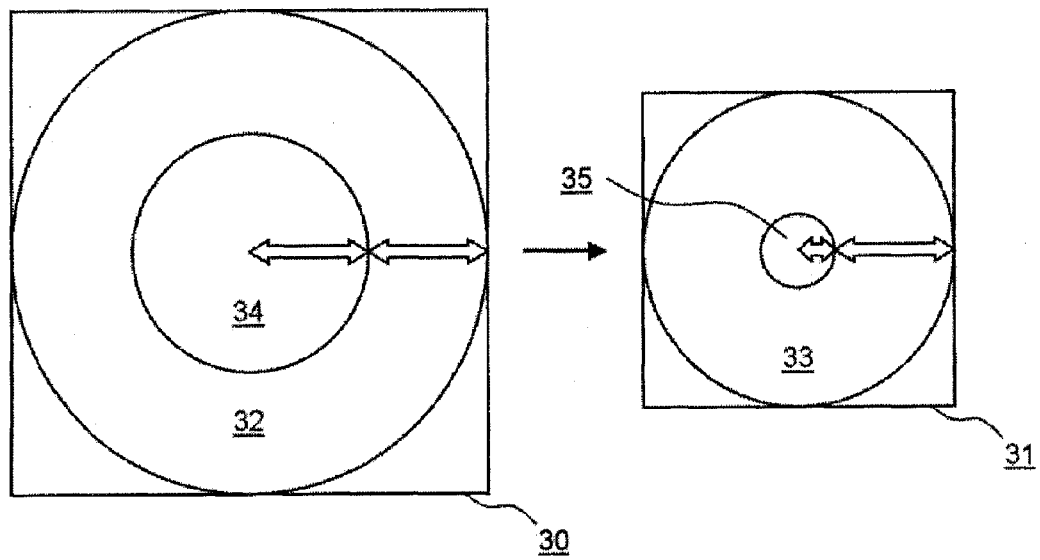
FIG. 4 shows an example of scaling of parts of an image to emphasize, in this example, the periphery.
Figure 5:
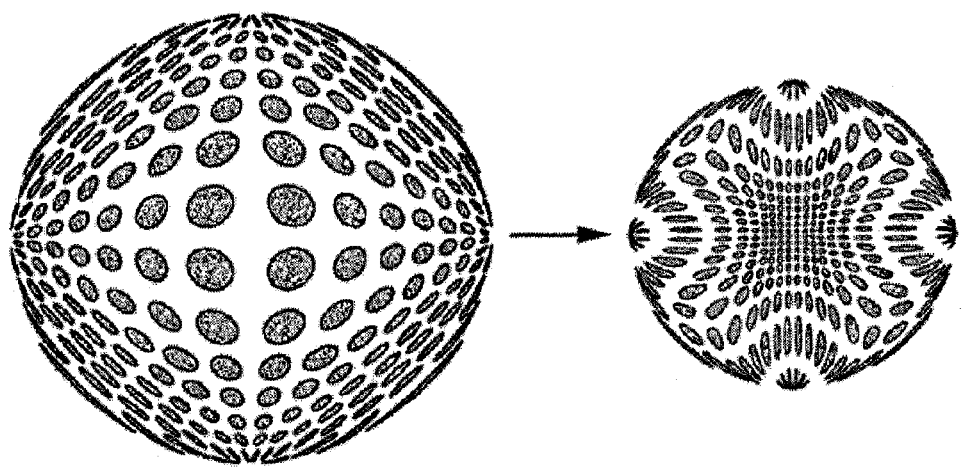
FIG. 5 shows another example of peripherally enhanced scaling.

A preferred embodiment uses non-uniform mapping to emphasise the image periphery while reducing the size of raw circular image data. A typical fisheye lens produces an image in which there is a linear relationship between the radius from the centre of the image and the FOV that is represented. This can be illustrated by a straight line on a graph as shown in FIG. 2. In the disclosed mapping, the curve of this graph is modified to give a greater emphasis to the periphery of the image, as shown in FIG. 3. In a way, this preferred embodiment emulates an image captured through a purpose-designed lens built to enhance periphery vision (as described in U.S. Pat. App. No. 60/553,186, entitled "Wide Angle Electronic Camera with Improved Peripheral Vision," which is hereby incorporated by reference). As well as resulting in a smaller less-resource demanding image, a greater proportion of the pixels represent the periphery of the scene than would have been assigned if a linear scaling had been performed. FIG. 4 shows an example of a preferred embodiment. The size of the original raw image [30] is reduced [31]. The area corresponding to the image periphery occupies a greater proportion of the total area in the transformed image [32] than the original image [33]. The area corresponding to the image centre occupies a reduced proportion of the total area in the transformed image [35] than the original image [34]. FIG. 5 also illustrates the effect of this peripherally enhanced scaling.

Figure 13:
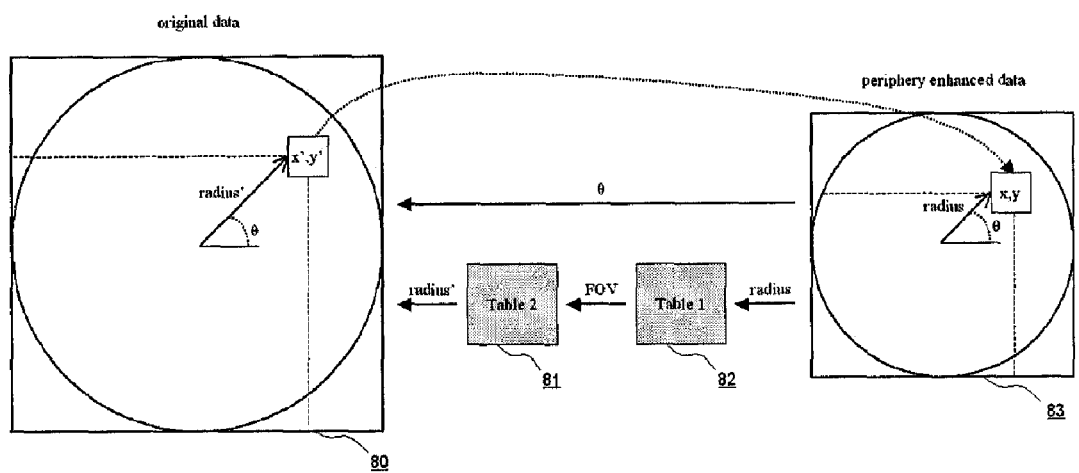
FIG. 13 shows an example of periphery enhanced scaling.

FIG. 13 shows a method of performing the periphery enhanced scaling. A pixel in the periphery-enhanced data image (PED) [83] has an associated Cartesian coordinate (x,y). The value for this pixel is determined by extracting a value from the corresponding position in the original un-scaled data [80] (x',y'), using interpolation if necessary.

As the coordinate calculation is performed in polar coordinates, the (radius,θ) of the PED pixel is calculated from (x,y) using the centre of the fisheye circle as the origin. The polar coordinate of the corresponding original data location (x',y') needs to be calculated. Although the angle θ remains unchanged by the periphery enhanced scaling, the original data location will obviously have a different radius (defined as radius'), giving polar coordinates (radius',θ). The radius' is calculated using a two-stage table lookup. Firstly, the FOV (also known as "field angle") represented by the radius is determined by using 'Table 1' [82]. This mapping depends on the desired profile of the periphery enhancement (e.g. FIG. 3). Secondly, the FOV is used to determine radius' by indexing 'Table 2' [81]. This mapping depends on the characteristics of the optics used to capture the original raw wide-angle data (e.g. FIG. 2). The polar coordinates (radius',θ) are used to calculate (x',y'). This gives the position in the un-scaled data from which a value needs to be extracted to determine pixel (x,y). Interpolation will often be required to calculate an accurate pixel value.

In the preferred embodiment motion analysis, such as object tracking, is performed on the periphery enhanced raw image. In another embodiment, the raw image is passed through the colour-pipeline before the motion analysis is performed. A further embodiment transforms the periphery enhanced scaling raw image into a cylindrical projection before motion analysis is performed.

Further Embodiment Descriptions

Although the disclosed embodiments of the wide-angle input data describe it in the context of being obtained from an imaging sensor, one of ordinary skill in the art will readily recognise that the input data could be obtained from any device with a high-resolution wide-angle imager, a digital video recorder, a web camera, a mobile wide-angle phone, a wide-angle video-conference device, or a variety of other devices while remaining in the spirit and scope of the present invention.

In one embodiment, the raw wide-angle data is sourced from a digital video recorder (DVR). The DVR preferably stores the data as raw data (e.g. bayered data) that requires treatment in an image pipeline. Such wide-angle data is handled in the same manner as techniques applied to the sensor data disclosed herein, obviously without sensor feedback such as exposure and gain control.

Although the disclosed embodiments of the input video image data describe it in the context of representing a wide-angle image, one of ordinary skill in the art will readily recognise that the input image could be any high-resolution video image while remaining in the spirit and scope of the present invention. The present inventions may be applied to allow the cost-effective processing of a narrow-angle high-resolution image. In such a case, a VCAM may be generated from a portion of the video, however the full geometric transformation may not be necessary (e.g., only basic transformations such as scaling may be necessary). In such a device, a VCAM image and scaled full-FOV image may be similarly processed in separate pipelines and composited together to form a Multiview.

MODIFICATIONS AND VARIATIONS

As will be recognized by those skilled in the art, the innovative concepts described in the present application can be modified and varied over a tremendous range of applications, and accordingly the scope of patented subject matter is not limited by any of the specific exemplary teachings given.

For example, though particular examples have been given of camera systems and specific transforms listed for preferred embodiments, other systems can of course implement the present innovative concepts. Likewise, other transforms can be developed for implementing these innovations.

Additional general background, which helps to show variations and implementations, may be found in the following publications, all of which are hereby incorporated by reference:

REFERENCES CITED

U.S. Pat. No. Re 36,207, entitled "Omniview Motionless Camera Orientation System," which is hereby incorporated by reference.

U.S. Pat. No. 6,243,099, entitled "Method for Interactive Viewing Full-Surround Image Data and Apparatus Therefor," which is hereby incorporated by reference.

U.S. Pat. No. 3,971,065, entitled "Color Imaging Array," which is hereby incorporated by reference.

U.S. Pat. No. 6,665,009, entitled "On-Chip Dead Pixel Correction in a CMOS Imaging Sensor," which is hereby incorporated by reference.

U.S. Pat. No. 6,970,194, entitled "Defect Correction in Electronic Imaging Systems," which is hereby incorporated by reference.

U.S. Pat. No. 5,402,182, entitled "Automatic White-Balance Controlling Apparatus," which is hereby incorporated by reference.

U.S. Pat. No. 6,965,401, entitled "White Balance Correcting Device," which is hereby incorporated by reference.

U.S. Pat. No. 6,956,967, entitled "Color Transformation for Processing Digital Images," which is hereby incorporated by reference.

U.S. Pat. No. 6,600,517, entitled "System and Method for Improving the Sharpness of a Video Image," which is hereby incorporated by reference.

U.S. Pat. No. 6,958,783, entitled "Adaptive Non-Linear Noise Reduction Techniques," which is hereby incorporated by reference.

U.S. patent application Ser. No. 10/186,915, entitled "Real-Time Wide-Angle Image Correction System and Method for Computer Image Viewing," which is hereby incorporated by reference.

U.S. patent application Ser. No. 10/837,012, filed Apr. 30, 2004, entitled "Correction of Optical Distortion by Image Processing," which is hereby incorporated by reference.

U.S. patent application Ser. No. 10/837,325, filed Apr. 30, 2004, entitled "Multiple View Processing in Wide-Angle Video Camera," which is hereby incorporated by reference.

U.S. Patent Application Ser. No. 60/665,767, entitled "Tracking Moving Objects Accurately on a Panoramic Video,"

U.S. patent application Ser. No. 10/924,279, filed Aug. 23, 2004, entitled "Tracking Moving Objects in Video Using Wavelet Domain Information," by A. E. Cetin and Y. Ahiska, which is hereby incorporated by reference.

U.S. patent application Ser. No. 11/203,807, entitled "Region-Sensitive Compression of Digital Video," which is hereby incorporated by reference.

U.S. patent application Ser. No. 10/837,019, filed Apr. 30, 2004, entitled "Method of Simultaneously Displaying Multiple Views for Video Surveillance," which is hereby incorporated by reference.

U.S. Patent Application Ser. No. 60/553,186, entitled "Wide Angle Electronic Camera with Improved Peripheral Vision," which is hereby incorporated by reference U.S. patent application Ser. No. 11/287,465, entitled "Interactive Wide-Angle Video Server," which is hereby incorporated by reference.

U.S. Provisional Patent Application Ser. No. 60/681,109, filed May 13, 2005, entitled "Stereographic Correction in a Camera," which is hereby incorporated by reference.

U.S. patent application Ser. No. 10/769,652, entitled "Method and System for Processing an Image with an Image-Capturing Device," which is hereby incorporated by reference.

Public Domain Documents

[1]—"Fundamentals of Digital Image Processing" by Anil Jain, Prentice-Hall, NJ, 1988, which is hereby incorporated by reference.

[2]—"Color Filters and Processing Alternatives for one-chip cameras" by Parulski and A. Kenneth, IEEE Transactions on Electron Devices. Vol. ED-32, No. 8, August 1985, which is hereby incorporated by reference.

[3]—"The Image Processing Handbook" IEEE Order No. PC5592, Second Edition, 2516, ISBN 0-8493-2516-1, which is hereby incorporated by reference.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A method of reducing the data size of wide-angle video image data, comprising the steps of:

retrieving distorted raw input data corresponding to at least one defined virtual camera coordinates comprising less than all of a wide angle video image data from a sensor;

decreasing a resolution of said corresponding raw data at least partially depending on a ratio between a size of said virtual camera coordinates and a size of said wide angle image data from said sensor;

and passing the decreased resolution corresponding raw data through an image pipeline with image transformation to generate a virtual camera view corresponding to said coordinates.

2. A method as recited in claim 1 wherein said raw input data is bayered data.

3. A method as recited in claim 1 wherein said raw input data is de-bayered data.

4. A method as recited in claim 1 wherein said image transformation is performed using one of a tabular method, a 3D projection method or a 2D transform mapping method.

5. A method as recited in claim 1 wherein said corresponding raw data is retrieved using windowing.

6. A method as recited in claim 1 wherein said virtual camera view can be moved around the wide-angle video by ePTZ dependent on a user input.

7. A method as recited in claim 1 wherein said virtual camera view can be moved around the wide-angle video by intelligence.

8. A method as recited in claim 1 wherein unspecified areas in said wide-angle input data are filled with an arbitrary colour.

9. A method as recited in claim 1 wherein said virtual camera view is composited as part of a collage of views.

* * * * *